United States Patent [19]

Hsu et al.

[11] Patent Number: 4,782,794
[45] Date of Patent: Nov. 8, 1988

[54] FUEL INJECTOR SYSTEM

[75] Inventors: Bertrand D. Hsu, Erie, Pa.; Gary L. Leonard, Schenectady, N.Y.

[73] Assignee: General Electric Company, Erie, Pa.

[21] Appl. No.: 89,207

[22] Filed: Aug. 25, 1987

Related U.S. Application Data

[63] Continuation-in-part of Ser. No. 897,458, Aug. 18, 1986, abandoned.

[51] Int. Cl.$^4$ .............................................. F02D 19/04
[52] U.S. Cl. .................................... 123/23; 239/88
[58] Field of Search ............... 123/23, 1 R, 24; 60/39, 60/464; 239/88, 92, 93, 94, 95, 96, 112, 113, 410, 411, 408, 412, 453, 584, 533.3, 575

[56] References Cited

U.S. PATENT DOCUMENTS

| | | | |
|---|---|---|---|
| 1,843,410 | 2/1932 | Von Salis | 239/96 X |
| 2,380,148 | 7/1945 | Camner | 239/94 |
| 2,759,771 | 8/1956 | Grigar | 239/89 |
| 4,228,958 | 10/1980 | Perry | 239/411 |
| 4,266,727 | 5/1981 | Happel et al. | 239/409 |
| 4,283,012 | 8/1981 | Hanson | 239/411 X |
| 4,335,684 | 6/1982 | Davis | 123/1 A |
| 4,569,484 | 2/1986 | Phatak | 239/410 |
| 4,612,898 | 9/1986 | Steiger et al. | 123/299 |
| 4,653,437 | 3/1987 | Firey | 123/23 |
| 4,662,315 | 5/1987 | Sommer | 123/23 |
| 4,698,069 | 10/1987 | Firey | 123/23 |

FOREIGN PATENT DOCUMENTS

124642  4/1919  United Kingdom .
494951  11/1938  United Kingdom ............. 239/533.3

OTHER PUBLICATIONS

J. B. Dunlay et al, "Slow-Speed Two-Stroke Diesel Engine Tests Using Coal-Based Fuels, "ASME Paper No. 81-DGP-12, (Jan. 1981, Houston, TX).
S. F. Nydick et al, "Continued Development of a Coal Water Slurry Fired Slow-Speed Diesel Engine . . . " ASME Paper No. 87-ICE-10 (Feb. 1987, Dallas, TX).

*Primary Examiner*—Raymond A. Nelli
*Attorney, Agent, or Firm*—Albert S. Richardson, Jr.

[57] ABSTRACT

A fuel injection system particularly adapted for injecting coal slurry fuels at high pressures includes an accumulator-type fuel injector which utilizes high-pressure pilot fuel as a purging fluid to prevent hard particles in the fuel from impeding the opening and closing movement of a needle valve, and as a hydraulic medium to hold the needle valve in its closed position. A fluid passage in the injector delivers an appropriately small amount of the ignition-aiding pilot fuel to an appropriate region of a chamber in the injector's nozzle so that at the beginning of each injection interval the first stratum of fuel to be discharged consists essentially of pilot fuel and thereafter mostly slurry fuel is injected.

30 Claims, 6 Drawing Sheets

FUEL INJECTOR SYSTEM

The invention was made with support of the Government of the United States of America under contract DE-A21-85MC22181 awarded by the Department of Energy. The Government has certain rights in this invention and in any resulting patent.

This application is a continuation-in-part of patent application Ser. No. 897,458 filed on Aug. 18, 1986, and assigned to the assignee of the present invention now abandoned.

FIELD OF THE INVENTION

This application relates generally to fuel injection systems and more particularly to a system for injection fine particles of coal mixed with water into the cylinders of a diesel engine.

BACKGROUND OF THE INVENTION

In a manner well known to persons familiar with this technology, diesel engines efficiently convert the latent heat of hydrocarbon fuel into useful mechanical power. In operation, a metered amount of fuel is injected into each cylinder of the engine at recurrent intervals synchronized with rotation of the engine crankshaft to coincide with the air-compression stroke of a reciprocating piston. As pressure increases, the compression temperature in the cylinder rises and the injected fuel is soon hot enough to ignite. The resulting combustion or firing of fuel in the cylinder forces the piston to move in the opposite direction, thereby applying torque to the engine crankshaft.

The conventional engine fuel is a relatively low grade, refined petroleum known generally as diesel fuel oil which has desirable ignition and heat release characteristics. Diesel fuel oil has acceptably low levels of corrosive, abrasive and other noxious matter, and it is in ample supply at the present time. But for nearly a century persons skilled in this art have known that coal, in the form of either a dry powder or a liquid slurry (i.e., a mixture of pulverized coal or other form of carbon dust and a liquid carrier such as oil or water), is an alternative fuel for diesel engines. Interest in developing a practical coal-fueled diesel engine has varied over the years directly with the cost and inversely with the supply of standard diesel fuel oil. For a review of such development efforts, see the article entitled "Slow-Speed Two-Stroke Diesel Engine Tests Using Coal-Based Fuels" by J. P. Davis, J. B. Dunlay, M. K. Eberle, and H. A. Steiger, published in 1981 as paper No. 81-DGP-12 by the American Society of Mechanical Engineers (New York, N.Y., U.S.A.).

The injection of a mixture of coal and water (hereinafter sometimes referred to as "CWM") into a compression ignition reciprocating internal combustion engine such as a large, medium-speed, multicylinder diesel engine, poses problems not typically encountered in the injection of pure liquid fuels. In such a mixture there are fine particles of coal which can cause excessive rates of wear and premature failure of components in a fuel injection system. CWM fuel includes, for example, from less than 30% (by weight) to as much as 60% coal particles in the range of from 0.1 to 50.0 microns in diameter. These particles are both abrasive and corrosive to the materials used in the fuel injection system. Furthermore, the ignition delay time of CWM is undersirably long, typically, five to six times longer than the ignition delay time of standard diesel fuel oil.

A fuel injection system capable of reliably injecting CWM fuels must not only be capable of avoiding the premature wear problems described above, but must also be capable of injecting the fuel in a manner to obtain proper combustion in each cylinder of the diesel engine. To obtain proper combustion the CWM has to be discharged into the combustion chamber in a finely atomized state. Very high injection pressures (e.g., on the order of 10,000 to 15,000 psi) are required to cause sufficient atomization of the CWM so that this fuel will mix adequately with air in the combustion chamber for ignition and complete burnout in the time available (e.g., 10 to 12 milliseconds in an engine running at 1,000 rpm), and such high injection presses need to be sustained to ensure good combustion at reduced loads/speed. Further, the CWM fuel injection must be closely metered in quantity and time.

In a conventional positive displacement injector assembly, a spring-loaded needle valve moves reciprocally inside a hollow nozzle, guided in the cylindrical opening or bore of the injector body. A very close, smooth fit is maintained between the cylindrical surface of the needle and the guiding surface of the injector body, and a small amount of liquid fuel is allowed to leak past the needle to provide lubrication and ensure freedom of movement. Normally the needle is held down by spring pressure in an orifice-blocking position, in which a conical surface at its lower end sealingly mates with a correspondingly shaped valve seat in the vicinity of the nozzle tip. Periodically a pressurized charge of diesel fuel oil is delivered to an inlet port of the injector by an external fuel pump. This charge exerts hydraulic pressure on the conical surface of the needle to compress the hold-down spring and lift the needle a short distance, thereby opening the orifice in the valve seat and allowing the pressurized diesel fuel to spray into the associated cylinder via one or more holes in the nozzle tip. For stable operation, the pressure supplied by the associated fuel pump will continue to rise after the needle lifts and throughout most of the injection interval. The needle will return to its orifice-closing position as soon as the fuel injection pressure drops below the spring pressure.

While a positive displacement type of injector system enables the amount and timing of diesel fuel injection to be precisely metered, the injection pressure in a practical injector of this type is limited to a relatively low magnitude of from 3,000 to 4,000 psi at the initiation of needle lift, and its maximum magnitude will decrease as engine load and speed are reduced. In order to obtain efficient and complete combustion in a coal-fueled engine, much higher injection pressure will be needed for adequate atomization of the more viscous CWM fuel. Good atomization is vitally important in the early, pre-ignition phase of each injection interval when the compression temperature is relatively low and rising. Ignition and combustion will both be helped, at both full load and part load, by injecting the CWM fuel at a pressure that is initially high enough to ensure good atomization and that is not reduced with engine load. For these reasons, a high-pressure accumulator type of injector assembly is better suited for injecting CWM fuel. In such an assembly, diesel fuel is accumulated and stored under the desired high pressure in a chamber that communicates with the space around the needle valve adjacent to the valve seat. The needle is maintained in its closed position, against the pressure being exerted on its conical end by the fuel, by an externally controlled hydraulic system or the like. Injection is permitted when the hold-down pressure of the hydraulic system is released or when an overriding hydraulic pressure is applied to the needle valve in the needle-lifting direction. See, for example, British Patent No. 494,951 and U.S. Pat. No. 1,843,410.

In an injector for CWM fuel, the particulate matter in the fuel will tend to migrate into the clearance gap between the needle valve and its guiding barrel, thereby abrading the bearing surfaces and/or causing seizure of the needle valve in the injector assembly. Because of this problem, an injector used with coal slurry fuels is likely to experience clogging and to have an undesirably short and unreliable service life. In order to increase the useful life of a CWM injector, it has heretofore been suggested to increase slightly the normally small, uniform clearance gap around the guided portion of the needle valve and to introduce compressed air, clean fuel, or lube oil under high pressure in back of the valve so as to flush out or purge the gap and inhibit ingress of the undesirable particles. But poor guidance, valve seating problems, and more wear are likely to result as the clearance gap increases.

More than 65 years ago it was recognized as desirable to inject a small amount of readily ignitable pilot fuel in diesel engines to improve combustion of "heavy" hydrocarbon fuels that are otherwise difficult to ignite. See British Patent No. 124,642. As used herein, the term "pilot fuel" means relatively light hydrocarbon fuel (e.g. methanol or even standard diesel fuel oil) characterized by being significantly easier to ignite than the primary fuel in the injection system. In a practical coal-fueled diesel engine, the injection of a small quantity of pure diesel fuel to aid ignition of the CWM fuel is particularly advantageous because CWM has a relatively long ignition delay time, because there are practical limits to the degree of atomization of CWM that can be obtained, and because there are practical limits in the amount that the inlet air temperature and the compression temperature of the engine cylinders can be increased compared to diesel engines using standard diesel fuel oil as their primary fuel. Obviously the pilot fuel can be introduced by mixing it with the CWM in the fuel supply tank. Alternatively, a separate pilot fuel injector can be used (U.S. Pat. No. 4,335,684), or the pilot and main injectors can be combined in one coaxial assembly (see U.S. Pat. No. 4,266,727). In any event, fuel costs will be saved (assuming that CWM fuel is less expensive than pilot fuel) by injecting the smallest amount of pilot fuel consistent with timely ignition of the CWM fuel.

SUMMARY OF THE INVENTION

Accordingly, a general objective of the present invention is to provide a new and improved system well-suited for periodically injecting metered amounts of coal-water mixture at very high pressures into the cylinders of a large, medium-speed diesel engine.

Another general object of the invention is to provide a CWM fuel injection system in which a controlled amount of ignition-aiding pilot fuel is combined with the CWM fuel in an optimum manner.

A further object is to provide, for injecting CWM fuel at high pressure into the cylinders of a variable speed diesel engine, an improved injector system that changes very rapidly between non-injecting and injecting states and that desirably sustains the high injection pressure over a wide range of engine speed.

A more specific object is to provide a high-pressure CWM fuel injection system characterized by the synergistic use of pilot fuel as a medium to ignite the coal-water mixture that is discharged into the combustion chamber when the needle valve of the injector is lifted, as a purging medium to prevent premature wear or seizure of the needle valve and its guide, and as a hydraulic medium to hold the needle valve closed between successive injection intervals.

Yet another object of the present invention is to provide a new and improved accumulator-type fuel injector particularly well suited for injecting coal slurry fuels at high injection pressures without premature wear heretofore associated with the injection of slurry fuels.

In carrying out the invention in one form, a mixture of coal and water (CWM) along with a pilot fuel is periodically injected into a cylinder of a diesel engine by a new and improved system including an accumulator-type fuel injector. The injector comprises an assembly including a generally-cylindrical, hollow nozzle portion having an orifice therein, a pressure vessel connected to the nozzle portion, a first inlet port communicating with an accumulator chamber inside the vessel, a second relatively small chamber inside the nozzle portion adjacent to its orifice, and a first fluid passage of relatively short length extending from the accumulator chamber to the second chamber. There is a cylindrical guide portion defining a concentric bore in the injector assembly, and at a first end of this guide portion the bore is in communication with the second chamber. A longitudinal section of a main needle valve is slidably disposed in the bore of the guide portion for reciprocal movement between open and closed positions, and at one end of the needle valve there is means for blocking the discharge of fuel from the second chamber through the orifice whenever the valve is closed. The injector assembly also includes a second inlet port communicating with a second fluid passage that extends through the assembly to the annular clearance gap around the longitudinal section of the needle valve near the first end of the guide portion. The injector further comprises control means associated with the other end of the main needle valve for permitting external control of the position of the needle valve.

The first inlet port of the above-summarized injector is adapted to be connected to first means for supplying CWM to the accumulator chamber and, via the first fluid passage, to the second chamber. Means is provided for supplying pilot fuel at very high pressure to the second inlet port and, via the second fluid passage and the clearance gap, to the second chamber in the injector. The new and improved fuel injection system further includes timing means coupled to the control means of the injector and adapted to operate in synchronism with rotation of the crankshaft of the engine to cause the needle valve periodically to move from opened to closed positions and alternately to permit needle valve movement from closed to opened positions. When the needle valve is opened, fuel discharges at high pressure through the orifice of the injector into the associated cylinder of the engine.

Pumping means operative in synchronism with the crankshaft rotation is provided for causing the aforesaid first means periodically to deliver pressurized charges of CWM into the accumulator chamber of the injector while the needle valve is closed. Pressure in the accumulator chamber will be higher than approximately 10,000 psi. Nevertheless, it is lower than the pressure at which the pilot fuel is supplied to the second inlet port, whereby there is a net flow of pilot fuel through the clearance gap and into the second chamber during the time that the valve is closed. This purges the clearance gap of CWM and prevents premature wear or seizure of the needle valve. To avoid needle valve guidance and seating problems and to minimize consumption of pilot fuel, the clearance gap is sufficiently constricted to limit the amount of pilot fuel flowing into the second chamber while the valve is closed to a relatively small percentage (e.g., less than approximately 3%) of the amount of fuel discharged during each valve-opened interval of the injector when the engine is running at full load. The cross-sectional area of the first fluid passage in the injector assembly is selected so that during each valve-closed interval the higher-pressure pilot fuel will accumulate in the second chamber adjacent to the nozzle orifice where it is advantageously positioned to be discharged from the injector, upon opening movement of the needle valve, in advance of the CWM flowing from the accumulator chamber. Consequently, each time the needle valve moves from closed to opened positions the first stratum of fuel injected into the cylinder consists essentially of pilot fuel, and thereafter mostly CWM is discharged. The initially high concentration of pilot fuel is relatively easy to ignite, and the heat that it releases assists the burning of the subsequently injected CWM. Even more pilot fuel may be discharged if the engine load and speed were reduced (because of the longer intervals between successive injections), and the extra pilot fuel will help to ignite the CWM which exhibits poor combustion properties at reduced engine power output.

In another aspect of the invention, the aforesaid needle valve control means comprises an auxiliary hydraulic system that applies a valve-closing pressure holding the main needle valve in its closed position against any opposing hydraulic pressure in the second chamber of the injector, and the pilot fuel supplying means is also connected to this auxiliary system so that the pilot fuel serves as the hydraulic medium therein. The auxiliary system includes a relatively small, spring-loaded needle valve that is lifted electromagnetically, upon operation of the timing means, to open a second orifice that relieves the valve-closing pressure of the pilot fuel and thereby enables hydraulic pressure in the second chamber to quickly lift the main needle valve to its opened position. Subsequently, when the timing means permits the small needle valve to return to a valve seat that encircles the second orifice, the pressure in the auxiliary system again attains that of the high-pressure pilot fuel and rapidly forces the main needle valve to its closed position.

BRIEF DESCRIPTION OF THE DRAWINGS

The subject matter which is regarded as the invention is particularly pointed out and distinctly claimed in the concluding portion of this specification. The invention itself, however, both as to its organization and its method of practice, together with further objectives and advantages thereof, may best be understood by reference to the following description taken in conjunction with the accompanying drawings, in which:

DETAILED DESCRIPTION OF THE INVENTION

Figure 1:
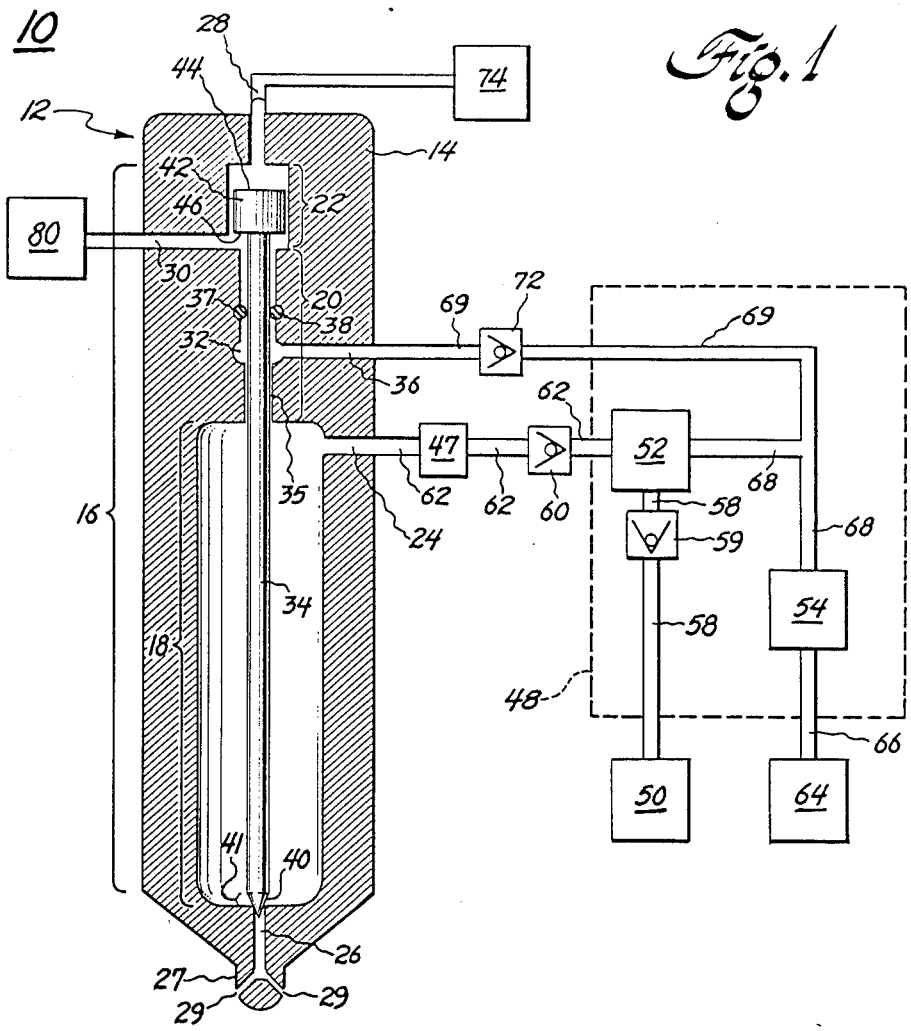
FIG. 1 illustrates a diagramatic, sectional, side view of a CWM fuel injection system, including an accumulator-type fuel injector, constructed in accordance with one aspect of the present invention.

Referring now to FIG. 1, a fuel injection system 10 constructed in accordance with a first aspect of the present invention includes an accumulator-type injector 12. Injector 12 comprises a generally cylindrical housing 14 constructed, for example, of a metal such as corrosion-resistant steel. Housing 14 defines an axially extending, general cylindrical bore 16 including a slurry fuel accumulator chamber 18, a needle valve guide portion 20, and a piston portion 22. An inlet port 24 in the sidewall of the housing 14 communicates with the accumulator chamber 18, and at its lower end the accumulator chamber communicates directly with a coaxial outlet passage 26 in a hollow nozzle 27 having a plurality of spray holes 29 through which the slurry fuel can disperse into a combustion chamber (not show in FIG. 1) in a manner well known to those skilled in the art.

Injector 12 further includes a pair of apertures 28 and 30 respectively communicating with substantially opposite axial ends of the bore piston portion 22. A generally cylindrical stem of a longitudinally movable needle valve 34 extends through the accumulator chamber 18, and a section thereof is slidably disposed in the guide portion 20. There is an annular clearance gap 35, for example on the order of 0.002 inch in the radial direction and one to two inches in the axial direction, between the cooperating bearing surfaces of the valve stem and guide. A purge chamber 32, in the form of an annular groove having a semi-circular cross-section, is located in the interior surface of the bore guide portion 20 and surrounds the stem of the needle valve 34. An aperture 36 in the sidewall of the injector housing 14 communicates with the purge chamber 32. A circular groove 37 is disposed in the interior surface of bore guide portion 20 between purge chamber 32 and bore piston portion 22 for accommodating an elastomeric seal 38 therein, the seal comprising, for example, a rubber O-ring encircling the valve stem. At the lower end 40 of the needle valve 34 a conical tip 41 projects into an orifice of the outlet passage 26 where it cooperates with a valve seat to block the discharge of slurry fuel from the accumulator chamber 18. A piston 42 is attached to the upper end of the needle valve 34 for longitudinal movement in the bore piston portion 22, with its opposite ends 44 and 46 separating the two apertures 28 and 30, respectively. It will be understood that injector 12 is shown substantially enlarged to better illustrate details thereof and is out of proportion to the remainder of system 10 described below.

The fuel injection system 10 includes an optional pressure vessel 47 disposed externally of injector 12 and connected to the accumulator chamber 18 via the inlet port 24 so as to increase the total effective volume for storing slurry fuel. As will be explained in further detail below, the total volume of the accumulator chamber 18, the vessel 47 and the fluid passage there between is sufficient to store a predetermined quantity of elastic energy in the form of pressurized slurry fuel (not shown in FIG. 1) having a given modulus of elasticity (sometimes also referred to as "bulk modulus"). As used herein, the term "slurry fuel" means a mixture comprising solid particles of coal suspended in a liquid carrier such as water. As used herein, the term elastic energy refers to the potential energy stored in a compressed liquid. As is known to those skilled in the art, elastic energy is a function of the volume of the liquid, the compressibility of the liquid and the pressure at which it is contained.

The fuel injection system further includes means 48 for concurrently pumping slurry fuel into the accumulator chamber 18 and a purging fluid into the purge chamber 32 of the injector 12. The pumping means 48 comprises fluid isolating means 52 and periodically operative pressure increasing means 54. Preferably the fluid isolating means 52 is a diaphragm pump and the pressure increasing means is a jerk pump. One side of the diaphragm pump 52 has an inlet connected to a suitable source 50 of slurry fuel via a check valve 59 and appropriate piping 58 and it has an outlet connected to the inlet port 24 of the injector via the pressure vessel 47 (if used), an intermediately disposed check valve 60, and appropriate piping 62. In the other side of the diaphragm pump 52 and driving chamber receives a pressurized working fluid via piping 68 from the jerk pump 54 which is connected in turn, via piping 66, to a suitable source 64 of such fluid. Preferably, as is illustrated in FIG. 1, the same jerk pump 54 is used for pumping the same working fluid as a purging fluid into the purge chamber 32 of the injector 12, via the aperture 36, piping 69, and an intermediately disposed check valve 72.

The fluid isolating means 52 can comprise any suitable pressure translating mechanism. A diaphragm pump well suited for this purpose is shown and claimed in U.S. Pat. No. 4,634,351 issued Jan. 6, 1987, in the name of Leonard et al., assigned to General Electric Company, and incorporated herein by reference. The pressure increasing means 54 comprises one of many, conventionally known jerk pumps such as a Lucas-Bryce, Ltd. model FCVAB jerk pump. Check valves 59, 60 and 72 are conventional, for example, spring-loaded ballcheck valves. The fuel source 50 preferably includes a progressive cavity pump for supplying a slurry fuel to the diaphragm pump 52 at a constant pressure of about 200 psi. The working fluid source 64 preferably comprises a low pressure pump for supplying a hydraulic fluid to the jerk pump 54 at a constant low pressure of about 50 psi.

System 10 further includes means 74 for providing a constant pressure fluid, e.g., nitrogen gas, to the first aperture 28 of bore piston portion 22, and means 80 for providing a hydraulic fluid of controllable, variable pressure to the second aperture 30.

In operation, the fuel injection system 10 is intended to inject slurry fuel comprising a coal-water mixture (CWM) into a cylinder (combustion chamber) of a diesel engine (not shown in FIG. 1) adapted to run on such fuel. The hydraulic fluid supplied by the source 64 preferably comprises a compatible, pure liquid fuel such as diesel oil. The fluid source 74 provides nitrogen gas at a constant pressure to pressurize the bore piston portion 22 in the space above piston surface 44, thereby normally biasing the needle valve 34 to a closed position in which the valve tip 41 is sealingly seated in the orifice of the outlet passage 26 of the accumulator chamber 18.

During each interval that the injector 12 is closed (as shown in FIG. 1), the jerk pump 54 is operated to drive the diaphragm pump 52 which in turn pumps a discrete charge of CWM fuel from the source 50 into the pressure vessel 47 and the accumulator chamber 18. The jerk pump 54 is periodically operated to increase fuel pressure until a predetermined amount of elastic energy is stored in the chamber 18. The volume of the accumulator chamber 18, as well as the pressure of the CWM fuel contained therein, are both selected such that the pressurized fuel contains sufficient elastic energy to enable a desired quantity of CWM fuel to be discharged from the chamber 18 through the outlet passage 26 at a desired injection pressure during the subsequent interval when the needle valve 34 is lifted from its orifice blocking position. The external vessel 47 is used only if the volume of the chamber 18 in a injector of practical dimensions is too small to store the amount of elastic energy required. The check valve 60 functions to contain the fuel in the accumulator chamber 18 between operating periods of the jerk pump, while check valve 59 functions to prevent fuel in the diaphragm pump from being forced back into source 50.

Concurrently with the periodic pumping of CWM fuel into the accumulator chamber 18 of injector 12, the jerk pump 54 pumps fluid from the source 64 through piping 69, check valve 72 and aperture 36 into the purge chamber 32. It will be appreciated that, because the pressure drop of the hydraulic fluid flowing through piping 69 and check valve 72 is less than the pressure drop of the more viscous CWM fuel flowing through the accumulator pump 52, check valve 60 and piping 68, each pulse of hydraulic fluid will be delivered to the purge chamber 32 at a higher pressure than the CWM fuel in the accumulator chamber 18. This slurry-free fluid from the source 64 fills the purge chamber 32 and the clearance gap 35 around the needle valve stem in the bore guide portion 20 between the elastomeric seal 38 and the accumulator chamber 18. Being at a higher pressure than the fuel in the accumulator chamber 18, the fluid flows from the purge chamber into the accumulator chamber, thereby preventing corrosive or abrasive particles in the CWM fuel from entering the gap 35 and fouling the injector 12. The volume of the purge chamber 32 should be between 0.05 and 5.0 percent of the total volume of the accumulator chamber 18 and the pressure vessel 47 (if used) so that during a typical interval of about 0.1 second between successive injections, the quantity of purging fluid flowing from the chamber 32 into the chamber 18 will be sufficient to purge the clearance gap 35 but insufficient to alter substantially the composition of the CWM fuel in the chamber 18. In a system employing a diesel oil purging fluid, the volume of the purge chamber 32 is preferably approximately 0.5 percent of the volume of the accumulator chamber 18 (and optional volume 47).

As described above, once the accumulator chamber 18 is filled with slurry fuel at a predetermined pressure, the injection energy is stored as elastic energy in the compressed fuel volume. To effect injection, the pressurized hydraulic fluid source 80 is operated to increase the pressure acting on the piston surface 46 in the bore piston portion 22 of the injector 12 to a value high enough to overcome the normal biasing force exerted by the pressurized nitrogen above the piston surface 44, whereby the stem of the needle valve 34 is permitted to move in an upward direction (as viewed in FIG. 1) to an open position wherein the valve is lifted and its conical tip 41 is separated from the orifice of the outlet passage 26 so as to enable CWM fuel to discharge through the nozzle openings 29. This opening movement of the valve stem is aided by the hydraulic pressure which the CWM fuel exerts in the needle-lifting direction on the conical tip at the lower end 40 of the needle valve. Because the outlet 26 is in direct communication with the high-pressure accumulator chamber 18, there are no undesirable pressure waves or oscillations to impede or delay the initial rise of pressure in the region of its orifice when the valve stem begins to lift. After the needle valve has been open for a desired injection interval, the pressure supplied by fluid source 80 is removed, thereby permitting the pressure supplied by the nitrogen source 74 to move the valve stem back to its closed position. This operation is subsequently repeated each time an injection of CWM fuel is desired. In a typical fuel injection cycle, the needle valve 34 is lifted for a duration of approximately 0.005 second once every 0.1 second.

Figure 2:
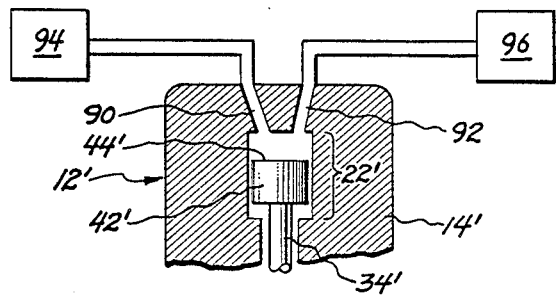
FIG. 2 illustrates an alternative form of the control means for the FIG. 1 fuel injector.

FIG. 2 shows an alternative embodiment of the means for externally controlling the movement of the needle valve in the injector. In FIG. 2 an injector 12' includes a housing 14', a needle valve 34' and a piston 42' substantially identical in structure to the unprimed, similarly numbered features of FIG. 1. In this embodiment, first and second apertures, 90 and 92 respectively, communicate with substantially the same axial end of bore piston portion 22' in fluid flow communication with the top piston surface 44'. Means 94 for providing a hydraulic fluid under a constant high pressure to the bore piston portion 22' is connected to the first aperture 90. Fast-acting valve means for draining such fluid from the bore piston portion 22' is connected to the second aperture 92. In operation, with the valve 96 closed, the hydraulic pump 94 is used to inject pressurized fluid into the bore piston portion 22' above piston surface 44', thereby normally biasing the needle valve stem of the injector 12' to its closed position. The valve 96 is subsequently opened to drain the pressurized fluid from bore piston portion 22' and permit the lifting force exerted on the conical tip (not shown in FIG. 2) of the needle valve 34' by the compressed fuel in the accumulator chamber to force the valve 34' to the open position described above. It will be understood that the relative diameters of apertures 90 and 92 can be adjusted to control the opening and closing speeds of the injector 12'.

In summary, there is provided a new and improved system for injecting slurry fuels at high pressures. In the embodiment described above, the fluid that purges the clearance gap 35 around the bearing surface of the needle valve of slurry fuel is "pulsed." That is, high pressure purging fluid will be supplied to the purge chamber 32 intermittently, each time the periodically operative jerk pump 54 causes the diaphragm pump 52 to deliver a charge of slurry fuel to the accumulator chamber 18 of the injector. Furthermore, the specified volume relationship of the purge and accumulator chambers 32 and 18 (plus 47) ensures that the amount of purging fluid that will flow through the gap 35 into the lower-pressure accumulator chamber 18 is within prescribed limits. The system also permits external control of the opening and closing movement of the injector's needle valve, thereby accommodating the desired high fuel injection pressure at the beginning of each injection interval. As a matter of example and without limitation, experiments were performed using a system of the type shown in FIGS. 1 and 2 to inject CWM fuel into a combustion test chamber. Highly reliable injection of well-atomized CWM fuel was obtained at pressures in the range of 10,000–20,000 psi and at rates up to four cubic centimeters per injection at approximately 500 injections per minute.

It will be appreciated by those skilled in the art that the seal 38 is not limited to a rubber O-ring seal but could comprise another type of seal, such as a lip seal or simply a very close tolerance fit between the needle valve stem and the bore guide portion 20. The various pumps, valves and fluid/pressure sources are selected for their described functions and are not limited to the embodiments described herein. Nitrogen source 74 (FIG. 1) is representative of any suitable pneumatic or hydraulic means for biasing the needle valve stem to a closed position, and mechanical biasing means (such as a spring) could be used in lieu thereof.

Figure 3:
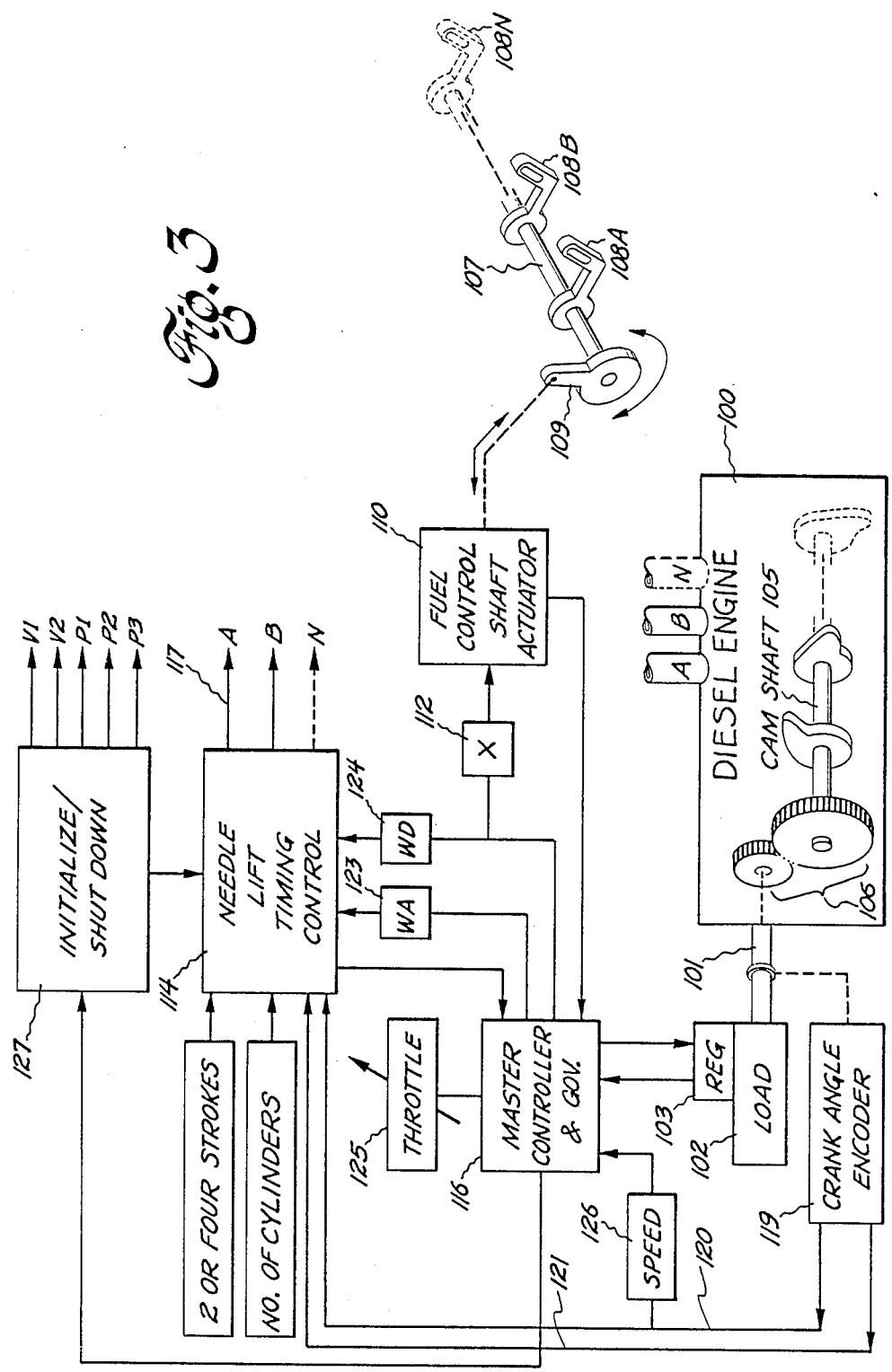
FIG. 3 is a functional block diagram of a coal-fueled medium speed multicylinder turbocharged diesel engine and the associated controls for its fuel injection system.

FIGS. 3–6 illustrate the presently preferred embodiment of an integrated pilot fuel system for injecting CWM fuel into a compression-ignition engine. Referring now to FIG. 3, a large, medium speed, multicylinder, turbocharged diesel engine 100 has a crankshaft 101 mechanically coupled to a variable load 102 such as the rotor of an alternating current generator that supplies electric power to an electric load circuit. The power output of the generator and hence the load imposed on the engine crankshaft 101 is limited by a regulator 103. Although not shown in FIG. 3, the engine 100 has two or more cylinders in which reciprocating pistons are respectively disposed, the pistons being respectively connected via rods and journals to individual eccentrics or cranks of the crankshaft 101. In a typical medium speed 4,000-horsepower engine, there are 16 cylinders, the cylinder bore is approximately nine inches, and the compression ratio is of the order of 12. Each cylinder has air inlet and exhaust valves (not shown) that are controlled by associated cams on the engine camshaft 105 which is mechanically driven by the crankshaft 101. In a 4-stroke engine, the camshaft 105 turns once per two full revolutions of the crankshaft, and therefore 2:1 speed reducing gearing 106 is provided as shown.

Each cylinder of the engine 100 has means for mounting at least one fuel injector. Symbolic representations of CWM fuel injectors are shown in FIG. 3 at A, B...N. As will soon be explained in more detail, the amount of CWM fuel discharged into each cylinder during each injection interval varies with the angular position of a fuel control shaft 107 connected via a parallel array of cranks 108A, 108B...108N to adjusting rods of a family of fuel pumps (not shown in FIG. 3) that are individually associated with the respective injectors, A, B...N. The fuel control shaft 107 is coupled by a linkage 109 to suitable actuating means 110 for turning it to the desired position, as indicated by the value "X" of a variable electrical input signal supplied to the actuator 110 by control means 112.

The start and duration of the fuel injection intervals are determined by a needle lift timing control means 114 in conjunction with a master controller and engine speed electronic governor 116. A binary signal on a first output line 117 of the timing control means 114 is supplied to the needle valve control means of injector A (see FIGS. 4 and 5) to determine the opened and closed states of this injector, and similar but time-displaced signals on the other output lines of the timing control means 114 are supplied to the other injectors B...N. In order to synchronize each of these signals with the rotation of the engine crankshaft, the timing control means 114 receives periodic electrical signals from conventional crank angle encoder means 119 associated with the crankshaft 101. The crank angle encoder 119 is suitably arranged to indicate the angular position of the engine crankshaft by providing on a first output line 120, once each crankshaft revolution, a discrete reference signal coinciding with the moment of time when the reciprocating piston in the No. 1 cylinder reaches its top dead center (TDC) position and by additionally providing on a second output line 121 a train of timing signals (e.g., 360 such signals per revolution) that mark, respectively, the angular advancement of the crankshaft from the TDC position through predetermined angular increments (e.g., 1, 2, 3 . . . 360 degrees).

The needle lift timing control means 114 is programmed to decode the signals from the crank angle encoder 119 in accordance with the number of cylinders (e.g. 8, 12, or 16) and the number of strokes per cycle (2 or 4) of the engine 100. During each cycle of operation, the needle lift signal on the output line 117 of the timing control means 114 will change states to initiate a fuel injection interval of the injector A as the piston of the associated cylinder approaches the TDC position of its firing or power stroke. The time at which this actually occurs is measured in angular degrees "WA" of crankshaft rotation in advance of the TDC position, and it is determined by the value of a variable electrical input signal supplied by control means 123. Subsequently, the needle lift signal on the line 117 returns to its injector-closed state, thereby terminating fuel injection, on the expiration of a variable interval (i.e., crankshaft angle "WD") which is determined by the value of a variable electrical input signal supplied by control means 124. Both of the WA and WD signals from control means 123 and 124 in turn are determined by the master controller and electronic governor 116 as functions of a variable command signal received from an operator-controlled throttle 125 and an engine speed feedback signal received from speed sensing means 126 connected to the first output line 120 of the crank angle encoder 119. As is indicated in FIG. 3, the variable fuel-quantity determining signal X that is supplied to the fuel control shaft actuator 110 tracks the injection duration signal WD. WA, WD and X will be coordinated and varied by the master controller and engine speed electronic governor 116 in an appropriate manner to obtain the desired performance of the engine 100. For example, either fuel efficiency, smokeless emissions, or service life could be optimized.

As is indicated schematically in FIG. 3, the master controller 116 also controls the engine load limiting regulator 103 and an initialize and shutdown function 127. It is programmed to vary the maximum load as a function of the command signal received from the throttle 125, and it appropriately controls the initialize and shutdown function 127. The latter function will provide two valve control signals V1 and V2 and three pump control signals P1, P2 and P3. The purposes of these signals and the operation of the initialize and shutdown function 127 will soon be explained in conjunction with the description of FIG. 4.

The binary signal on the first output line 117 of the needle lift timing control means 114 is supplied to bi-stable electrohydraulic control means in the CWM fuel injector A. The injector A is shown functionally in FIG. 4 and in cross-section in FIG. 5. It includes an internal accumulator chamber 130 in which CWM fuel is stored under high pressure, and a nozzle 131 from which a desired amount of the stored fuel is discharged in a finely atomized state when the injector's needle valve 132 moves away from an orifice-blocking or closed position to which it is normally biased by the electrohydraulic control means 133. Needle lift is permitted only when the control means 133 is in an injector-opened state as determined by the signal on the line 117. Before the various structural features of the presently preferred embodiment of the injector A are described in more detail, the fuel injection system in which this injector is used will be explained with reference to FIG. 4.

Figure 4:
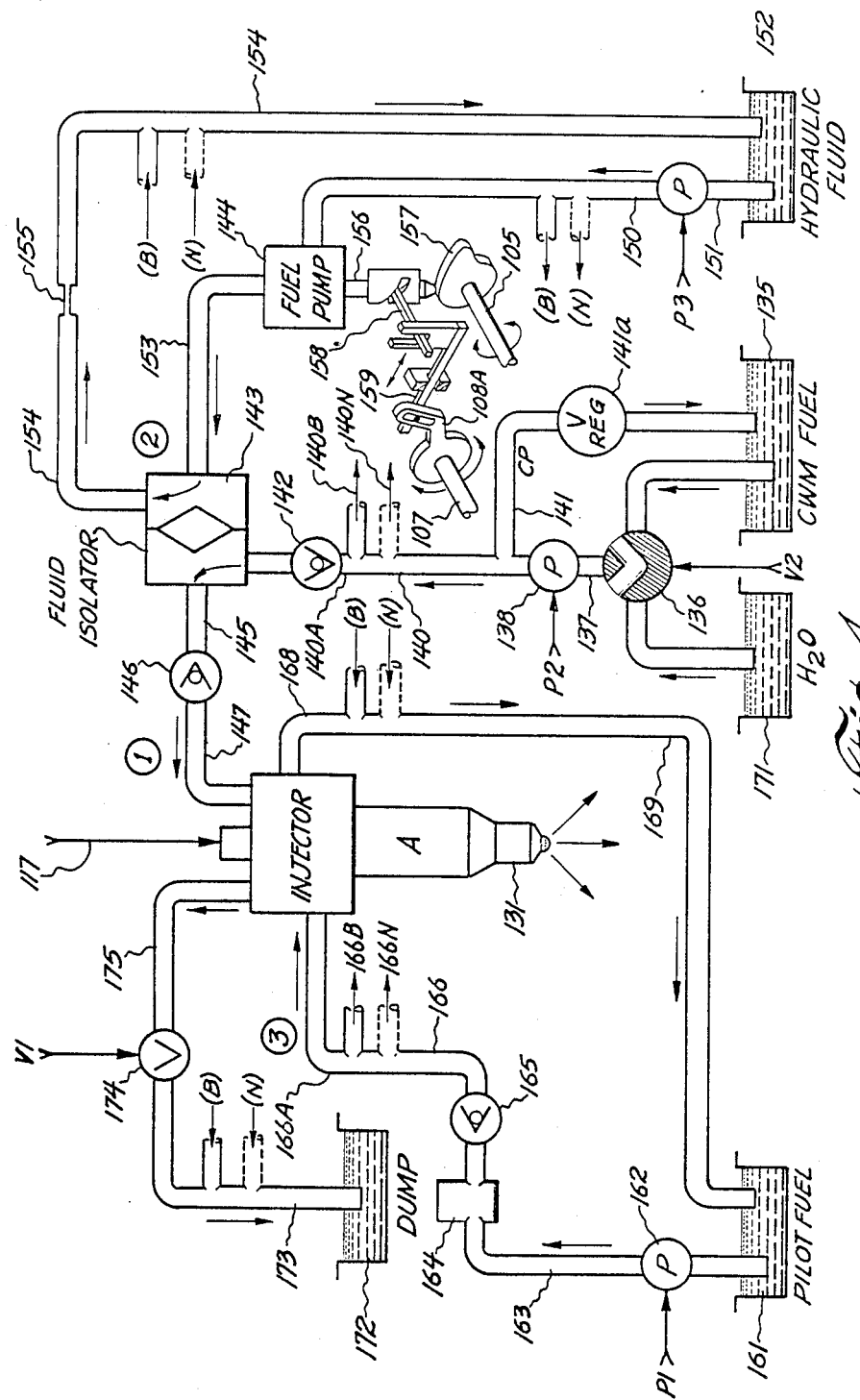
FIG. 4 is a schematic diagram of the presently preferred embodiment of the new and improved system for injecting CWM and pilot fuels into one cylinder of the diesel engine shown in FIG. 3.

The primary fuel supply for the FIG. 4 injection system is a tank 135 of coal-water mixture (CWM). Preferably the mixture comprises approximately 50% water and approximately 50% United States bituminous coal that has been beneficiated by a physical process that reduces the coal to very small particles (e.g., with a mean particle size in the range of three to five microns in diameter) having very low ash and sulfur content (not more than approximately 1% each). In practice, the miscibility and other fluid properties of the mixture can be improved by adding relatively small amounts of certain other useful ingredients. For example, a non-ionic surfactant such as Triton-X 114 will promote the formation of a solvation shell of water around the surface of each particle of coal, thereby inhibiting undesirable settling or agglomeration of the coal particles in the CWM mixture. The CWM fuel needs to have a low enough viscosity to flow freely through holes of approximately 0.02 inch diameter in the tip of the injector nozzle 131. For further information about the constituents of the CWM fuel and the advantages of using such fuel in a diesel engine, see U.S. Pat. No. 4,335,684.

As is shown in FIG. 4, the CWM fuel flows from the tank 135 through a 2-way valve 136, a pipe 137, and a suitable feed pump 138, into a fluid header 140 having a plurality of branch lines 140A, 140B...140N in parallel with a line 141 that returns excess fuel to the tank 135. The feed pump 138 is a progressive cavity pump, an air-driven diaphragm pump or the like. When turned on by the control signal P2 it is capable of continuously pumping the CWM fuel into the header 140, and the return line 141 includes suitable pressure regulating means 141a for maintaining the header pressure at a relatively constant pressure of approximately 400 psi. The fuel in the branch line 140A flows through a check valve 142 to the inlet port of the slurry fuel pumping side of a fluid isolating diaphragm pump 143 where its pressure will be substantially elevated (e.g., to approximately 15,000 psi) each time an associated fuel pump 144 is operated. A fuel outlet pipe 145 of the fluid isolator 143 is connected through another check valve 146 and a high pressure fuel supply line 147 to an injector CWM inlet port which in turns communicates with the accumulator chamber 130 inside the injector A. Whenever the CWM fuel in the isolator 143 and in its outlet pipe 145 is pressurized by the operation of the fuel pump 144 and is greater than the pressure (1) on the downstream side of the check valve 146, a charge of CWM can flow out of the pipe 145, through the outlet valve 146, and the supply line 147, and into the accumulator chamber 130 of this injector. Each of the other branch lines from the fluid header 140 is connected through similar valves, fluid isolator and fuel supply line to the CWM inlet port of a separate one of the fuel injectors B...N (not shown in FIG. 4). The check valves 142 and 146 and the diaphragm pump 143 can be similar in construction and operation to those described above with reference to FIG. 1.

The fuel pump 144 is a jerk pump or the like that operates periodically to cause the fuel injection system to deliver discrete charges of CWM fuel from the fluid isolator 143 into the accumulator chamber of the injector A at a very high pressure (1). Its working fluid is supplied at low pressure by a pipe 150 connected via a second feed pump 151 to a tank 152 of conventional hydraulic fluid. The feed pump 151 runs continuously when turned on by the control signal P3, and a conventional regulator (not shown) is connected to the pipe 150 to maintain the desired pressure therein (e.g., approximately 50 psi). The outlet valve of the jerk pump 144 is connected via a pipe 153 to the inlet port of the working fluid side of the fluid isolating diaphragm pump 143, and the outlet port of the same side is connected to a pipe 154 that returns the working fluid to the tank 152. The return pipe 154 has a constricted section 155 that provides the required back pressure during the pressure increasing period in the fuel injection system while allowing the hydraulic fluid to circulate at a relatively low rate for cooling. It will be understood that similar fuel pumps (not shown) are respectively associated with individual fluid isolators (not shown) through which CWM fuel will be supplied to the other injectors B...N, and they are connected between the pipes 150 and 154 by way of branch lines partially shown in FIG. 4.

The jerk pump 144 associated with injector A has a plunger 156 driven by a cam 157 on the engine camshaft 105. The lobe(s) of the cam 157 has an appropriate angular position and profile to lift the plunger 156 as a predetermined, periodically recurring crank angle(s) and at a desired rate in synchronism with the rotation of the engine crankshaft. Each time the plunger 156 is lifted, the jerk pump 144 increases the pressure (2) of the hydraulic fluid in the pipe 153. This pressure increment is translated by the isolator 143 to the CWM fuel in the outlet pipe 145. As soon as and so long as the fuel pressure in pipe 145 exceeds the pressure (1) in the fuel supply line 147, a charge of CWM fuel is delivered to the accumulator chamber inside the injector A. The amount or quantity of the charge depends on the effective stroke of the plunger 156, i.e., the portion of the total excursion of this plunger during which both the inlet and the spill ports in the barrel of the pump 144 are closed. The effective stroke is a function of the angular position of an arcuately movable control lever 158 which in turn is controlled by the fuel shaft 107 to which it is coupled by means of a linearly movable adjusting rod 159 and the associated crank 108A that is keyed to the shaft 107. As is indicated in FIG. 4 by way of example, a slotted end of the fuel crank 108A cooperates with a pin at one end of the rod 159, and the distal end of the lever 158 nests in a control fork at the opposite end of the same rod. It will be apparent that this rod and lever arrangement will adjust the angular position of the lever 158, thereby varying the effective stroke of the plunger 156, as the angular position of the shaft 107 changes in response to variations in the valve X as determined by the master controller and governor 116 (see FIG. 3). Although not shown in FIG. 4, suitable means could be provided, if desired, for automatically adjusting the position of the control fork on the rod 159 so that the effective length of this rod (and therefore the amount of each charge of CWM fuel delivered to the injector A) is individually varied as necessary to minimize any deviation between actual and desired peak firing pressures in the cylinder associated with this particular injector.

The CWM fuel injector A is also supplied with suitable pilot fuel from a tank 161. To be suitable, the pilot fuel needs to be a good lubricant, to be compatible with the CWM fuel, and to have a relatively short ignition delay time so as to aid the ignition of the CWM fuel. No. 2 diesel fuel oil is well suited as the pilot fuel. As is shown in FIG. 4, the pilot fuel flows from the tank 161 through a feed pump 162, a pipe 163 that communicates with a pressure accumulator or reservoir 164, and a check valve 165 into a high pressure fluid header 166 having a plurality of branch lines 166A, 166B...166N. The branch line 166A is connected to a pilot fuel inlet port of the injector A, while the branch lines 166B...166N are respectively connected to corresponding ports of the other injectors B...N (not shown in FIG. 4). The feed pump 162 is an oil pump or the like capable of operating continuously, when turned on by the control signal P1, to pump pilot fuel into the header 166 at a very high, relatively constant pressure (3) that is higher than the pressure (1) in the CWM fuel supply line 147. In the illustrated embodiment of the invention, pilot fuel pressure in the header 166 will be maintained at approximately 17,000 psi.

As will be explained below with reference to FIGS. 5 and 5A, there are two paths inside the injector A for the pilot fuel that is supplied via the branch line 166A: one leading to the injector nozzle 131, and the other leading to an outlet port which in turn is connected to low pressure piping 168, 169 through which pilot fuel from all the injectors can return to the tank 161.

As is shown in FIG. 4, the fuel injection system is also provided with means for flushing CWM fuel from the system when desired. For this purpose, a water source 171 is connected through the 2-way valve 136 to the inlet end of the pipe 137, and a CWM fuel dump tank 172 is connected through a waste collection pipe 173, a valve 174 that is closed during normal operation of the fuel injection system, and a drain line 175 to an injector CWM drain port that communicates with the accumulator chamber 130 inside the injector A. In operation, when a shutdown process is initiated by the master controller and electronic governor 116 and after the engine speed is reduced to idle, the valve 174 in each drain line 175 will be opened in response to the first valve control signal V1 from the initialize/shutdown function 127 (FIG. 3), and at the same time the 2-way valve 136 will be switched from its normal position (in which CWM fuel can flow from the tank 135 into the pipe 137) to an alternative position (in which water can flow from the tank 171 into the pipe 137) in response to the other valve control signal V2. After a time delay of sufficient length (e.g., two or three minutes) to ensure that all of the CWM fuel in the injectors A, B...N and in the respective fluid isolators 143 has been flushed out and replaced by water, the feed pumps 138, 151, and 162 are turned off. During this time delay, the fuel required for engine operation is supplied by separate, conventional diesel fuel oil injectors (not shown).

In order to restart the CWM fuel injection system after CWM fuel has been flushed from its injectors and fluid isolators, the system is initialized in the order stated below. The pilot fuel feed pump 162 is turned on by the pump control signal P1. After a delay of one or two seconds to allow pressurized pilot fuel to enter the injectors A, B...N, the valve 174 in each drain line 175 is temporarily opened by the valve control signal V1 to drain water from the injectors. Then, in rapid sequence, the CWM feed pump 138 is turned on by the pump control signal P2, each drain valve 174 is closed, feed pump 151 is turned on by the pump control signal P3 to supply all of the fuel pumps (144) with hydraulic fluid that enables them to begin periodically increasing the pressure of the CWM fuel in the respectively associated fluid isolators (143), and finally the engine is cranked.

Figure 5:
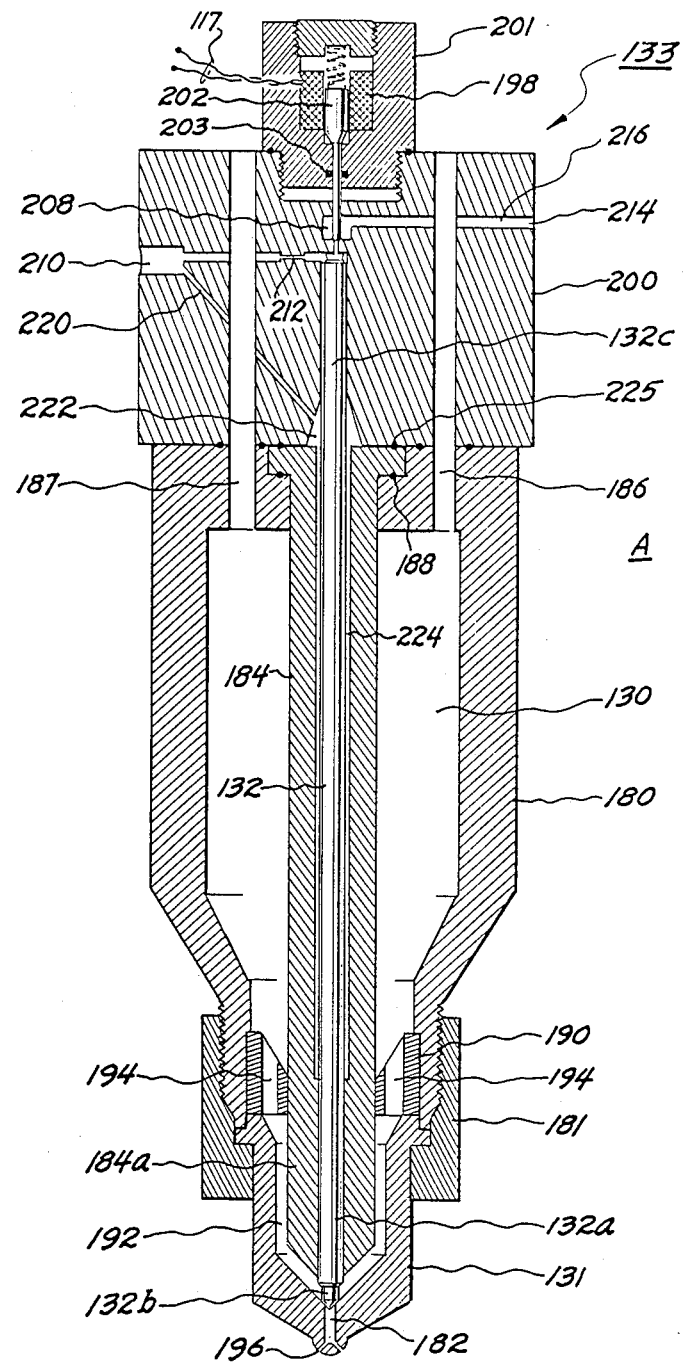
FIG. 5 is a sectional view of the injector shown in FIG. 4.
Figure 5A:
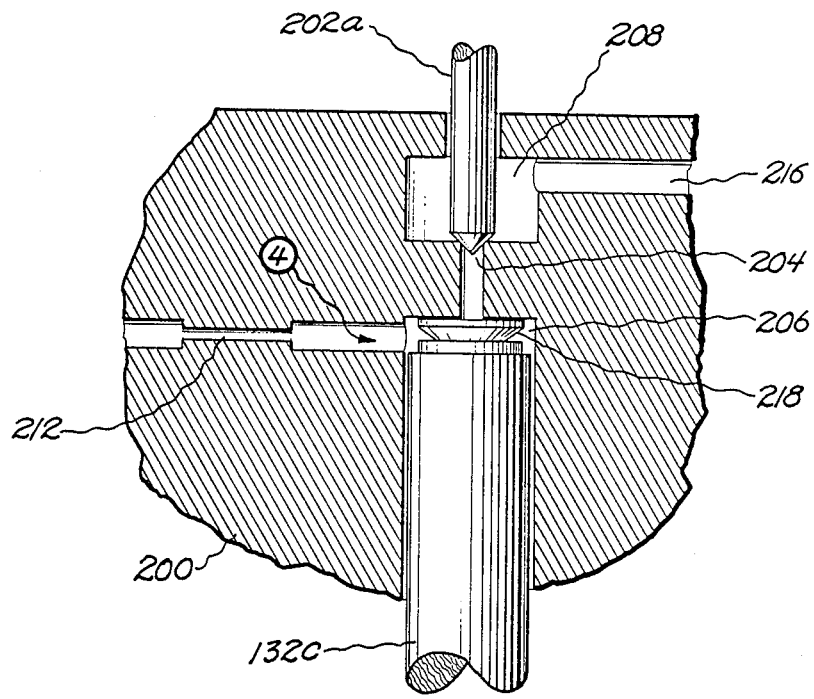
FIG. 5A is an enlarged partial view of the FIG. 5 injector.

In FIGS. 5 and 5A, structural details of a practical embodiment of the CWM fuel injector A are shown. The injector comprises an assembly of the previously-mentioned hollow nozzle portion 131, which is adapted to project into the associated cylinder of the diesel engine 100, and a generally cylindrical pressure vessel 180 the lower end of which is tightly connected to the nozzle 131 by means of an internally threaded nozzle retainer cap 181. The nozzle 131 has a tapered tip in which a short, coaxial fuel sac or outlet passage 182 is provided. Cylindrical means 184 for housing the injector needle 132 is concentrically disposed inside both the vessel 180 and the nozzle 131 of the injector assembly. The annular space between the tube-like needle housing 184 and the sidewall of the vessel 180 is the previously-mentioned chamber 130 in which CWM fuel is accumulated and stored under pressure. Communicating with the chamber 130 at the upper end of the vessel 180 there are CWM inlet and outlet ports 186 and 187, respectively. Suitable means (not shown) are provided for respectively connecting the high-pressure CWM fuel supply line 147 (FIG. 4) to the inlet port 186 and the normally closed drain line 175 to the outlet port 187.

An annular flange at one end of the tubular needle housing 184 fits snugly into a correspondingly shaped concentric recess in the upper end of the pressure vessel 180 of the injector assembly, and under this flange there is suitable sealing means 188 (e.g., an O-ring of elastomeric material) for preventing pressurized CWM fuel from leaking out of the chamber 130. At the opposite end of the tube 184 there is a cylindrical needle guide portion 184a. This guide portion passes through an annular plug 190 that is tightly attached to (or is part of) the lower end of the vessel 180, and it extends into the hollow nozzle 131 where its lower end is located in relatively close proximity to the orifice of the outlet passage 182. The tube 184 is held by the plug 190 so that the bore of its guide portion 184a is concentrically positioned in the injector assembly. As is shown in FIG. 5 there is some space between the exterior surface of the guide portion 184a and the interior surface of the nozzle wall, and this space forms a second pressure chamber 192 of relatively small size adjacent to the orifice of the outlet 182 in the nozzle tip. At its lower end the bore in the guide portion 184a communicates with this chamber. In the body of the plug 190 there are a plurality of parallel holes 194 forming a fluid passage that extends from the accumulator chamber 130 to the nozzle chamber 192, thereby enabling the pressurized CWM fuel to flow into the latter chamber. To obtain good dynamic response, the length of the passage is short enough to avoid pressure oscillations (i.e., reflected pressure waves) that might otherwise undesirably affect the flow of CWM fuel from the chamber 130 to the chamber 192 when each injection interval commences. The total cross-sectional area of the holes 194 will be just large enough to ensure negligible pressure drop in this fluid passage during a fuel injection interval.

The injector needle 132 has a longitudinal section 132a slidably disposed in the bore of the guide portion 184a of the needle housing 184 for reciprocal movement between opened and closed positions. At the lower end of the longitudinal section 132a there is another, shorter section 132b of reduced diameter. The latter section of the needle extends beyond the guide portion 184a and terminates in a conical tip. Whenever the needle 132 is in a closed position (shown in FIG. 5), its conical tip sealingly mates with a correspondingly shaped valve seat around the orifice of the outlet 182 in the nozzle tip, thereby blocking the discharge of fuel from the chamber 192 through the orifice and the outlet passage of the injector assembly. Upon lifting the needle 132, the conical tip thereof moves away from its orifice-blocking position, and the fuel in the chamber 192 will rapidly discharge through the outlet 182 and a ring of spray holes 196 in the tip of the nozzle 131. To obtain adequate atomization of CWM fuel in the engine cylinder, approximately ten or more spaced-apart spray holes 196 will need to be provided, with each hole having a diameter in the range of approximately 0.015 to 0.025 inch. If desired, another type of nozzle (e.g., a pintle nozzle) could be used in lieu of the illustrated hole-type nozzle.

The position of the needle valve in the injector is determined by the state of the binary signal on the first output line 117 of the needle lift timing control means 114 (see FIG. 3). In FIG. 5 the line 117 is shown as a twisted pair of insulated wires that are connected to the coil 198 of a solenoid which is part of the injector's bi-stable electrohydraulic control means 133 associated with the needle 132. The control means 133 preferably comprises a generally cylindrical housing 200 that is suitably mounted on (or an integral part of) the pressure vessel 180 and that has a concentric bore in which the upper section 132c of the injector needle is slideably disposed. The control means 133 also comprises a solenoid housing 201 tightly attached to the upper end of the housing 200. The coil 198 of the solenoid encircles a spring biased, axially movable metal core or armature 202 that is disposed concentrically with respect to the tubular needle housing 184 of the injector assembly. As is best seen in FIG. 5A, the armature 202 has a depending extension 202a that passes through an O-ring seal 203 (see FIG. 5) in the housing 201 and projects into the adjoining housing 200 where it serves as a relatively small, spring-loaded, reciprocally movable, needle-like control valve for the electrohydraulic control means 133. A conical surface at the tip of the control valve 202a cooperates with a correspondingly shaped valve seat that encircles a small orifice 204 concentrically disposed inside the housing 200 between two adjacent chambers 206 and 208 of an auxiliary hydraulic system.

The first auxiliary chamber 206 inside the housing 200 has a relatively small volume, and it communicates with the upper end of the concentric bore in which section 132c of the main injector needle is located. It also communicates with a pilot fuel inlet port 210 of the injector via a fluid duct which includes a constricted section 212 of reduced cross-sectional area. The second auxiliary chamber 208 communicates with an injector outlet port 214 via a pressure relief duct 216 in the housing 200. Suitable means (not shown) are provided for respectively connecting the high-pressure pilot fuel branch line 166A (FIG. 4) to the inlet port 210 and the low-pressure pilot fuel return pipe 168 to the output port 214. As is indicated in FIG. 5A, a flexible belleville washer 218 or the like is inserted above the needle section 132c in the chamber 206 to hold the needle valve in its previously described closed position whenever the engine is shutdown.

FIG. 5 shows an additional fluid duct 220 in the housing 200 of the control means 133, which duct extends from the pilot fuel inlet port 210 to an annular space 222 around the needle 132 in a region thereof adjacent to the flanged end of the needle housing 184 in the injector assembly. Above the space 222 the inside diameter of the concentric bore in the housing 200 is only slightly larger than the outside diameter of the needle section 132c, and the resulting tight fit between these relatively movable parts provides the desired needle alignment and guidance at the upper end of the needle 132. Below the space 222 and above the guide portion 184a of the tubular needle housing 184 an annular gap 224 of relatively large radial and axial dimensions surrounds the needle 132. Duct 220, space 222 and gap 224 serve as a fluid passage for pressurized pilot fuel to flow from the inlet port 210 to the annular clearance gap between the cooperating bearing surfaces of the needle section 132a and its guide 184a. Between the flanged end of the needle housing 184 and the control means housing 200 a concentric O-ring seal 225 of elastomeric material or the like is captured, thereby preventing pilot fuel leakage from the space 222 through this interface.

Pressurized pilot fuel can flow from the inlet port 210, through the above-described fluid passage, through the small annular clearance gap between the needle section 132a and guide portion 184a of the injector assembly, and into the chamber 192 that is located inside the hollow nozzle 131 of the injector. This will desirably lubricate the guided section 132a of the needle valve and purge the latter gap of CWM fuel that otherwise tends to migrate into the clearance gap from the nozzle chamber 192. To assure a net flow of pilot fuel through the annular clearance gap and into the chamber 192 while the needle valve 132 is in its closed position, each charge of CWM fuel is delivered (via the inlet port 186) to the accumulator chamber 130 at a pressure that is lower than the average pressure at which pilot fuel is supplied to the inlet port 210. To avoid needle valve guidance and seating problems and to minimize consumption of pilot fuel, the annular clearance gap around the needle section 132a is sufficiently constricted to limit the amount of pilot fuel flowing into the nozzle chamber 192 while the needle valve is closed to a relatively small fraction of the amount of fuel discharged during each injection interval when the diesel engine is running at full load. Preferably the small fraction is less than 3/100. In a practical embodiment of the invention, about 50% (by weight) of the CWM fuel will be coal, and the amount of pilot fuel consumed at full load typically will be in a range of approximately 1.5 to 2.5% by volume, which range is equivalent to a range of approximately 3 to 5% of the total energy (heating valve) of the combination of CWM and pilot fuels that the injector discharges during an injection interval. To obtain this result, the bore of the needle guide portion 184a will be dimensioned so that for a specified pressure differential and at a specified temperature the leak rate through the clearance gap is within an empirically determined range. By way of example and without limitation, in an injector for an engine operating at a full-load speed of approximately 1,000 rpm, wherein the pilot fuel pressure at the inlet port 210 is maintained at approximately 17,000 psi and the CWM fuel in the accumulator chamber 130 is charged to a pressure of approximately 15,000 psi, and wherein the diameter of the needle section 132a is approximately 0.25 inch, the clearance gap surrounding this section will have an average radial dimension on the order of 0.0005 to 0.0008 inch and an axial dimension of approximately two inches.

The above-described injector A is made of suitable wear-resistant material. For improved durability and longer service life, a protective coating of ceramic material may be applied to the critical surfaces of the metallic parts of the injector, i.e., the surfaces that are exposed to the relatively corrosive CWM fuel. In practice, certain parts of the injector will be made of wear-resistant ceramic material rather than metal.

In operation, the needle valve 132 of the CWM fuel injector A is in its closed position so long as the needle lifting signal on the line 117 is in a low or "0" state and the small control valve 202a is spring-biased to the position shown in FIG. 5A in which it blocks the passage of fluid through the orifice 204 between the auxiliary chamber 206 and 208 in the electrohydraulic control means 133. In this state the hydraulic pressure (4) in the auxiliary chamber 206 will be the same as the pressure (3) of the pilot fuel supplied to the inlet port 210 of the injector. This pressure exerts a force in a downward direction (as viewed in the drawings) on the back or upper end of the needle section 132c, which force is high enough to hold the main needle 132 of the injector in its discharge-blocking position. It is apparent that the area over which the hydraulic pressure is applied at the needle's upper end is significantly larger than the area of the annulus formed by the diameter-reduction step between needle sections 132a and 132b, and the needle hold-down force will correspondingly exceed the needle lifting force that the pressurized fuel in the nozzle chamber 192 is applying to this annulus.

Periodically the signal on the line 117 is changed to a high or "1" state, and each time this occurs the solenoid coil 198 of the control means 133 is energized by electric current to initiate a fuel injection interval. As soon as the solenoid is so energized, its electromagnetic force quickly lifts the control valve 202a, against the force of its bias spring, to a position that permits abrupt release or discharge of pilot fuel from the auxiliary chamber 206 through the orifice 204 and into the low-pressure auxiliary chamber 208, and hence through the relief duct 216 to the outlet port 214. Consequently, there is a sudden loss of hydraulic pressure in the chamber 206, and the needle hold-down force now drops below the needle lifting force. The constricted section 212 in the duct between the chamber 206 and the high-pressure pilot fuel inlet port 210 has a cross-sectional area much smaller than that of either the orifice 204 or the gap between the orifice and the conical tip of the open control valve 202a, and a large pressure drop will develop across this section as some pilot fuel flows from the inlet port 210 to the relieved auxiliary chamber 206 and through the orifice 204 to the low-pressure outlet port 214. The tight fit around the needle section 132c will restrict the flow of high-pressure pilot fuel from the space 222 to the auxiliary chamber 206. With low pressure in the chamber 206, the needle-lifting pressure acting on the annulus of the needle valve in the nozzle chamber 192 begins to lift the main needle 132 from its closed position. As soon as the tip of the lowest section 132b of the needle moves away from the valve seat around the orifice of the nozzle outlet 182, its conical surface becomes exposed to the pressurized fuel in this region, and an additional lifting force will be exerted on the needle 132. As a result, the needle 132 moves very rapidly to its opened position, compressing the belleville washer 218 in the process.

Subsequently, when the solenoid coil 198 is next de-energized, the spring-loaded control valve 202a returns to its orifice-closing position, and hydraulic pressure is rapidly restored in the small auxiliary chamber 206. As the pressure (4) in the chamber 206 rises, the downward or closing force on the main needle 132 (abetted by the spring force of the belleville washer 218) will soon exceed the lifting force that is exerted on the same needle by the pressurized fuel in the nozzle chamber 192, and the needle is then forced to move to its closed position.

During the recurrent interval that the needle valve 132 remains closed between successive injection intervals, some pilot fuel will flow from the high-pressure inlet port 210, through the gap 224, through the small clearance gap around the needle section 132a, and into the nozzle chamber 192. As was explained hereinbefore, the latter gap is properly dimensioned to control the amount of pilot fuel so delivered to the chamber 192 during full load operation of the engine. Having a higher pressure than the CWM fuel in the interconnected chambers 130 and 192 of the injector, this pilot fuel tends to compress the CWM fuel and to replace it in the region where pilot fuel enters the chamber 192, which region is in the vicinity of the lowest section 132b of the needle 132. During each valve-closed interval, due in part to its entry turbulence and due also to the inherent process of molecular diffusion, the pilot fuel delivered to the nozzle chamber 192 will be diluted by the CWM fuel in the same chamber. The concentration of pilot fuel will be highest near the point of entry (around the needle section 132b) and will diminish with distance from that point. The rate of diffusion, which is a function of both the cross-sectional area of the annular portion of chamber 192 and the total area of the holes 194 that interconnect this chamber and the accumulator chamber 130, can be controlled by appropriately selecting the specified areas, consistent with the predominate need to avoid any appreciable pressure drop in these regions during an injection interval. A limit in the range of from 25 to 100 times greater than the total area of the spray holes 196 in the tip of the nozzle 131 is desirable. Preferably neither of the specified areas is larger than approximately 50 times the spray-hole area. With the molecular diffusion rate limited in this manner, with the short period of time available between injection intervals, and with a virtually continuous flow of pure pilot fuel into the lower region of the nozzle chamber 192 throughout this period, the CWM and pilot fuel will not mix evenly and a very high concentration of pilot fuel will tend to accumulate adjacent to the orifice of the nozzle outlet 182 where it is advantageously positioned to be discharged, upon opening movement of the needle 132, in advance of CWM fuel. In other words, at the beginning of each injection interval there is a stratum of mostly pilot fuel in the chamber 192 that will be discharged from the injector nozzle 131 into the associated cylinder prior to the CWM fuel. This stratum is immediately followed by a blend of pilot fuel and CWM fuel in a ratio that will diminish gradually until all of the pilot fuel that was delivered to the nozzle chamber of the injector during the preceding valve-closed interval is discharged. The initially high concentration of pilot fuel is relatively easy to ignite, and the heat that it releases will help evaporate water in the subsequently injected CWM fuel and will assist the eventual burning of the latter fuel. The relatively smooth transition from mostly pilot fuel to mostly CWM fuel during the injection interval will avoid knocking waves and combustion roughness in the cylinder, and it will contribute to a favorable heat release pattern that enables high efficiency to be obtained without an undesirably high peak combustion pressure.

This integrated pilot fuel system will utilize pilot fuel in a manner that is significantly more efficient than if the pilot fuel were mixed with the CWM fuel in the accumulator chamber 130 or were injected by a separate pilot injector. It is believed that good combustion will be achieved at full load (and full speed) with from 3% to approximately 5% pilot fuel (by heating valve). The advantage of the stratified injection effect described above can alternatively be obtained in an integrated system using a positive displacement type of injector (not shown) to which CWM fuel is delivered through a supply line and fluid passage means of appropriate trapped volume and limited area to ensure the desired concentration of pilot fuel in the region adjacent to the nozzle orifice by the time the fuel pump operates to initiate an injection interval. In this case, the pressure at which pilot fuel is continuously supplied to the injector will be lower than the hydraulic pressure required in the nozzle chamber to lift the injector needle, but it will be higher than the residual pressure at the conclusion of an injection interval (i.e., the pressure of the CWM fuel that is trapped, when the spring-biased needle valve closes, in the nozzle chamber and in the supply line connected between the injector and the check valve at the outlet of the source of pressurized CWM fuel).

Figure 6:
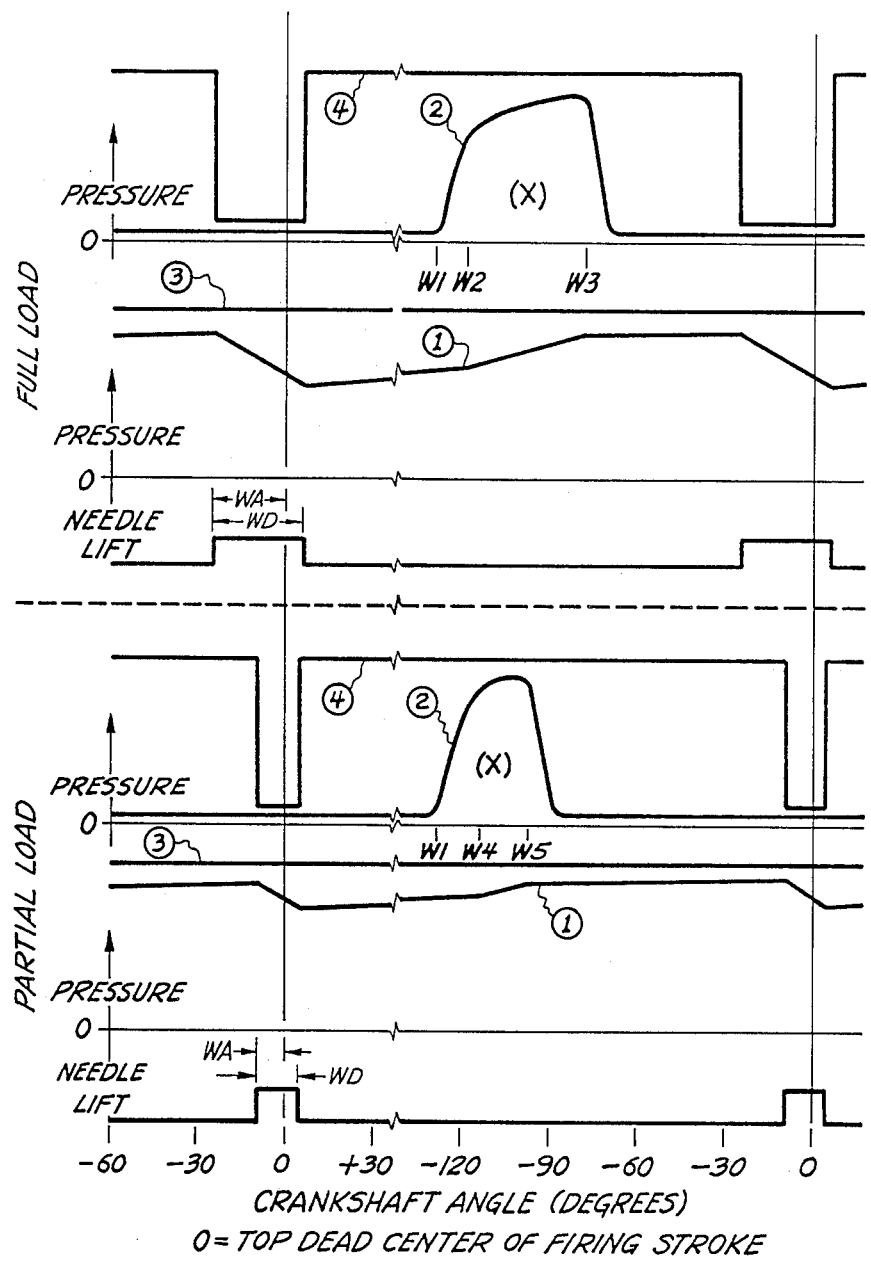
FIG. 6 is a chart of various fluid pressures vs. crankangle during one operating cycle of the system shown in FIG. 4 for both a full load and a typical partial load operating condition.

For a better understanding of the fuel injection system shown in FIGS. 3-5 and described above, the fluid pressure changes in various pipes and chambers of the system during a typical cycle of steady-state operation under both full load and part load conditions have been illustrated in FIG. 6. In either case, the signal on the first output line 117 of the needle lift timing control means 114 is periodically changed from low to high states, thereby activating the electrohydraulic control means 133 of the first injector A. This will occur at a commanded crank angle in advance of a reference angle (i.e., at WA degrees in advance of the crankangle at which the piston in the engine cylinder associated with the first injector is at the TDC position of its firing or power stroke), and as previously described it will cause an abrupt loss of needle hold-down pressure (4) in the chamber 206 of the injector's auxiliary hydraulic system. Now the injector needle 132 will be lifted to its opened position by the hydraulic pressure of the fuel in the nozzle chamber 192, and fuel begins to discharge at high pressure through the outlet passage 182 and the spray holes 196 of the injector nozzle 131. Later, after the engine crankshaft has turned through a predetermined crankangle WD, the signal on the line 117 will be changed from high to low state, thereby deactivating the control means 133 and enabling hydraulic pressure in the auxiliary chamber 206 to increase rapidly and attain a sufficiently high magnitude to force the injector needle 132 back to its close position.

During the injection interval WD, as fuel discharges from the nozzle chamber 192 and the interconnected accumulator chamber 130 of the injector, the pressure (1) in these chambers will decrease progressively, from the initially high level to a lower level, at a rate that depends on the dimensions of outlet passage 182 and spray holes 196. This is illustrated in FIG. 6 by the declining slope of the pressure trace 1 during each injection interval (i.e., the needle-lift interval WD). By way of example and without limitation, under full load conditions the master controller and engine speed governor 116 will set WD equal to approximately 30 degrees or more, and during this interval the fuel pressure will decrease by approximately 5,000 psi, from the original 15,000 psi to a lower level of approximately 10,000 psi. The amount of fuel discharged during an injection interval will be directly proportional to both the size of this pressure delta and the effective volume of the accumulator and nozzle chambers 130 and 192 (including the various fluid lines, ducts and passages in communication therewith), and it will be inversely proportional to the modulus of elasticity of the particular CWM fuel that is used in the injection system. If the injection of approximately four cubic centimeters of CWM fuel were required to obtain a desired power output per cylinder of a medium speed engine operating at full load, if the modulus of elasticity of this fuel were 500,000 psi, and if the pressure delta over the injection interval were 5,000 psi, the volume of the accumulator and nozzle chambers would need to be approximately 400 cubic centimeters (or 25 cubic inches). If the required volume were too large to be contained inside an injector of practical dimensions, an external pressure vessel of appropriate volume, such as the optional vessel 47 shown in FIG. 1, will be connected to the accumulator chamber 130 via the injector's CWM inlet port 186 and the high pressure fuel supply line 147 (FIG. 4), thereby enlarging the effective volume between the check valve 146 and the nozzle chamber 192.

At the beginning of each of its injection intervals, the first injector will discharge a stratum of finely atomized, almost pure pilot fuel. By the time the needle valve of this injector is reclosed to conclude the injection interval, pilot fuel ignition will have occurred in the associated cylinder of the diesel engine. The increasing pressure and temperature in the cylinder will enhance smooth and efficient ignition of the surrounding CWM fuel that was injected after the pilot fuel. The ensuing CWM combustion process will generate thermal energy that drives the power stroke of the first piston.

Once the injector needle valve recloses, the pressure (1) in the accumulator and nozzle chambers 130 and 192 will begin to rise at a relatively slow rate as the CWM fuel that remains in these chambers is compressed by the higher-pressure pilot fuel that is allowed to flow continuously from the high-pressure (3) pilot fuel header 166, through the injector's inlet port 210, through the small clearance gap around the needle section 132a, and into the nozzle chamber 192. As the engine crankshaft 101 turns between successive TDC positions of the firing stroke of the first piston (which is an angular advance of 720 degrees, in a 4-stroke engine), it will eventually reach an angular position (W1 in FIG. 6) at which the cam 157 on the camshaft 105 starts to lift the plunger 156 of the fuel pump 144 associated with the first injector. As this plunger is thus actuated, the pressure of the working fluid in the fluid isolating diaphragm pump 143 is increased. As is shown in FIG. 6, the working fluid pressure (2) starts increasing at a fast rate because of the relatively small volume of CWM fuel that the diaphragm pump is initially pressurizing—namely, the fuel in the piping and the slurry pumping chamber between the two check valves 142 and 146 (see FIG. 4). As the working fluid pressure increases, so does the CWM fuel pressure in the outlet pipe 145 of the diaphragm pump 143. The latter pressure soon attains the same level as the fuel pressure (1) in the accumulator chamber 130 (at crankangle W2 for the full load condition illustrated in FIG. 6), and thereafter the check valve 146 permits a charge of CWM fuel to pass from the tank 135 through the diaphragm pump 143 to the accumulator chamber 130 in the injector A. As the cam 157 continues to lift the fuel pump plunger 156, the fuel pressure (1) in the accumulator chamber will rise with the working fluid pressure (2) until the plunger reaches the end of its effective stroke (at crankangle W3 in FIG. 6), at which point the fuel pump's spill port is uncovered and the working fluid pressure (2) rapidly declines. It will be observed that as the crankshaft advanced from W2 to W3, pressure increased at a substantially lower rate than initially, because during that interval the CWM fuel in the accumulator chamber, a much larger volume than before, is being pressurized.

The increment between crankangles W1 and W3, and hence the quantity of CWM fuel delivered to the accumulator chamber 130 during the discrete charging interval W-W3, varies with the angular position of the fuel control shaft 107 which in turn is a function of the value X of the signal that the master controller and engine speed governor 116 supplies, via the control means 112, to the fuel control shaft actuating means 110 (see FIG. 3). Although not shown in FIGS. 4 and 6, the cam 157 could be alternatively constructed, if desired, to actuate the fuel pump plunger 156 more than once each cycle, whereby CWM fuel would be pumped into the accumulator chamber 130 of the injector in a series of two or more discrete steps each of which is of shorter duration than the single one shown in FIG. 6. In any event, during steady state operation the total amount of CWM fuel delivered to the injector during each interval that the injector needle is closed will equal the amount discharged during an injection interval, and the average pressure in the accumulator chamber during each closed interval will be lower than the average pressure at which pilot fuel is supplied to the injector. The full-load cycle time of a typical medium speed engine (i.e., the interval between successive 0-degree crankangles in FIG. 6) is approximately 0.1 second.

In FIG. 6 the pressure changes in the fuel injection system under a partial engine load condition can be compared with the full load condition described above. Under partial load, the fuel injection interval (WD) is smaller and there is less pressure loss in the accumulator chamber during this interval, whereby the amount of fuel discharged from the injector will be less than under full load conditions. As was pointed out hereinbefore, X tracks WD, and consequently there is a corresponding reduction in the CWM fuel charging interval W4-W5 under partial load conditions, whereby less CWM fuel will be delivered to the injector between successive injection intervals. Typically the engine crankshaft speed will decrease with load, and at partial load there is more time for high-pressure pilot fuel to flow into the nozzle chamber of the injector (it being understood that the real time between successive injection intervals increases as speed decreases). However, the flow rate of the pilot fuel decreases because during this time the CWM fuel pressure in the accumulator chamber 130 is higher at partial load than at full load, and therefore the pressure differential between the pilot fuel header and the accumulator chamber (i.e., the gap between traces 3 and 1 in FIG. 6) will now be less. The net result of the longer time but lower rate is that the amount of pilot fuel delivered to the nozzle chamber 192 between injection intervals may increase, as the load (speed) is reduced, to somewhat more than 3% of the amount of fuel discharged during the next injection interval. The extra pilot fuel at partial load is advantageous, because CWM fuel exhibits poor combustion properties at reduced engine power output when the cylinder inlet air temperature and pressure are relatively low.

While the presently preferred embodiment of the invention has been shown and described by way of illustration, numerous modifications, variations, substitutions and equivalents will probably occur to those skilled in the art. Accordingly, it is intended by the appended claims to cover all such changes and modifications as fall within the true spirit and scope of this invention.

We claim:

1. A system for injecting slurry fuel into a combustion chamber comprising:
 (a) an injector comprising:
  a housing defining a bore including a guide portion communicating with an accumulator chamber, said accumulator chamber having sufficient volume to store a predetermined amount of elastic energy in a slurry fuel having a given compressibility contained therein at a predetermined pressure, said housing having an inlet port and an outlet orifice communicating with said accumulator chamber;
  a movable needle valve extending through said bore and having a section thereof slidably disposed in said bore guide portion;
  control means associated with said needle valve for permitting external control of its movement between an open position wherein said outlet orifice is open and a closed position wherein said outlet orifice is blocked; and
  said housing further defining a purge chamber in a surface of said bore guide portion generally surrounding said needle valve section, and an aperture communicating with said purge chamber, the volume of said purge chamber being selected to be a predetermined relatively small percentage of the volume of said accumulator chamber;
 (b) first means connected to said inlet port and adapted to supply slurry fuel to said accumulator chamber;
 (c) second means for connecting said aperture to a supply of purging fluid; and
 (d) pumping means adapted to be connected to said first and second means and operative periodically to cause a charge of slurry fuel to be supplied by said first means to said accumulator chamber and concurrently to cause said second means to deliver a charge of purging fluid to said purge chamber at a pressure higher than the pressure of slurry fuel in said accumulator chamber.

2. The fuel injection system of claim 1 wherein said pumping means comprises means for increasing the pressure of the charge of fuel supplied to said accumulator chamber and for concurrently increasing the pressure of purging fluid in said second means.

3. The fuel injection system of claim 2 wherein said pressure increasing means utilizes a working fluid which is said purging fluid, and said pumping means further comprises fluid isolating means connected between said pressure increasing means and said first means.

4. The fuel injection system of claim 3 wherein said purging fluid is diesel oil.

5. The fuel injection system of claim 3 wherein said pressure increasing means comprises a jerk pump and said fluid isolating means comprises a diaphragm pump connected to said first means and driven by said jerk pump, whereby said diaphragm pump pumps said fuel and said jerk pump drives said diaphragm pump and pumps said purging fluid.

6. The fuel injection system of claim 5 wherein said first means includes a first check valve between said diaphragm pump and said inlet port and said second means includes a second check valve between said jerk pump and said aperture.

7. The fuel injection system of claim 1 wherein the control means of said injector is disposed in fluid flow communication with said bore guide portion and said injector further includes a fluid seal encircling said needle valve section between said purge chamber and said control means.

8. The system of claim 7 wherein said control means comprises a piston portion of said bore communicating with said bore guide portion of said injector, a piston slidingly disposed in the piston portion of said bore and attached to said needle valve, a pair of apertures in said injector housing communicating with said piston portion, and means connected to said pair of apertures for controlling the longitudinal position of said piston and hence the open and closed positions of said needle valve.

9. The system of claim 8 wherein said last-mentioned means comprises means for introducing fluids of appropriate pressures into said bore piston portion at opposite ends of said piston.

10. The system of claim 9 wherein a first fluid of substantially constant pressure is introduced at one end of said piston so as to bias said needle valve to said closed position and a second fluid of controllable variable pressure is introduced at the other end of said piston so as to selectively urge said needle valve to said open position.

11. The slurry fuel injection system of claim 1 wherein said accumulator chamber directly communicates with said outlet orifice.

12. The slurry fuel injection system of claim 1 wherein the volume of said purge chamber in said injector is selected to be in the range of from 0.05 to 5.0 percent of the volume of said accumulator chamber.

13. The system of claim 12 wherein the volume of said purge chamber is approximately 0.5 percent of the volume of said accumulator chamber.

14. The slurry fuel injection system of claim 1 wherein said first means includes a vessel of predetermined volume connected to said inlet port and adapted to store slurry fuel under pressure.

15. In an improved system for periodically injecting fuel into a cylinder of a diesel engine having a crankshaft, which fuel comprises a mixture of coal and water:

(a) an injector comprising:

an assembly including a generally cylindrical, hollow nozzle portion adapted to project into a cylinder of the engine, an orifice in said nozzle portion, a pressure vessel connected to said nozzle portion, a first inlet port communicating with an accumulator chamber inside said vessel, a second relatively small chamber inside said nozzle portion adjacent to said orifice, a first fluid passage extending from said accumulator chamber to said second chamber, and a cylindrical guide portion defining a concentric bore in the assembly, said bore communicating at one end of said guide portion with said second chamber;

a needle valve having a longitudinal section slidably disposed in the bore of the guide portion of said assembly for reciprocal movement between opened and closed positions, said needle valve also having means at one end thereof for blocking the discharge of fluid from said second chamber through said orifice whenever said needle valve is in its closed position; and control means associated with said needle valve for controlling its position;

said assembly having a second inlet port and a second fluid passage extending from said second inlet port to the annular gap between said needle valve and said guide portion near said one end thereof;

(b) first means connected to said first inlet port for supplying coal-water mixture to said accumulator chamber and, via said first fluid passage, to said second chamber;

(c) second means for supplying purging fluid to said second inlet port and, via said second fluid passage and said annular gap, to said second chamber;

(d) third means coupled to said control means and adapted to operate in synchronism with the rotation of the engine crankshaft to cause said needle valve periodically to move from opened to closed positions and alternately to permit needle valve movement from said closed position to said opened position in which said orifice is unblocked and fuel can discharge from the nozzle portion of said injector into the associated cylinder; and (e) periodically operative pumping means for causing said first means to deliver discrete, pressurized charges of coal-water mixture into said accumulator chamber while said needle valve is in its closed position;

(f) the average pressure of the coal-water mixture in said accumulator chamber during each interval that said needle valve is closed being lower than the average pressure at which said purging fluid is supplied to said second inlet port, whereby there is a net flow of purging fluid through said annular gap and into said second chamber.

16. The injection system of claim 15 wherein said accumulator chamber, said first passage, and said second chamber have a predetermined volume for storing fuel during the period between delivery of each charge of coal-water mixture and the subsequent closed-to-opened movement of said needle valve.

17. The system of claim 16 wherein said first means includes another pressure vessel of predetermined volume communicating with said first inlet port and adapted to store coal-water mixture under pressure.

18. The injection system of claim 15 wherein said annular gap is sufficiently constricted to limit the amount of purging fluid delivered to said second chamber during each valve-closed interval to a relatively small fraction of the amount of each discharge of fuel when the engine is running at full load.

19. The system of claim 18 wherein said small fraction is less than approximately 3/100 (by volume).

20. The system of claim 18 wherein said one end of said guide portion of the injector assembly is closer to said orifice than is the end of said first fluid passage in communication with said second chamber, and wherein said purging fluid is pilot fuel that will precede and aid ignition of the coal-water mixture discharged from the nozzle portion of said injector into the associated cylinder of the diesel engine during each interval that said needle valve is opened.

21. The system of claim 20 wherein said first fluid passage has a relatively short length selected to avoid pressure oscillations therein upon closed-to-opened movement of said needle valve.

22. The system of claim 20 wherein said first fluid passage has a cross-sectional area selected to ensure that a high concentration of pilot fuel will tend to accumulate in a region of said second chamber between said orifice and said one end of the guide portion of said injector assembly during each valve-closed interval when the engine is running at full speed.

23. The injection system of claim 15 wherein the pressure of the purging fluid supplied to said second inlet port continuously exceeds approximately 15,000 psi.

24. In an integrated pilot fuel system for periodically injecting, into a cylinder of a diesel engine having a crankshaft, a mixture of coal and water along with a pilot fuel that will aid ignition of the coal-water mixture:

(a) an injector comprising:

an assembly including a generally cylindrical, hollow nozzle portion adapted to project into a cylinder of the engine, an orifice in said nozzle portion, a chamber inside said nozzle portion adjacent to said orifice, a first inlet port, fluid passage means for connecting said first inlet port to said chamber, and a cylindrical guide portion defining a concentric bore in the assembly, said bore communicating with said chamber at one end of said guide portion in relatively close proximity to said orifice;

a needle valve having a longitudinal section slidably disposed in the bore of the guide portion of said assembly for reciprocal movement between opened and closed positions, said needle valve also having means at one end thereof for blocking the discharge of fluid from said chamber through said orifice whenever said needle valve is in its closed position; and means for holding said needle valve in its closed position;

said assembly having a second inlet port communicating with the annular gap between said needle valve and said guide portion;

(b) first means connected to said first inlet port for supplying pressurized coal-water mixture to said chamber;

(c) second means effective while said needle valve is in its closed position for supplying pressurized pilot fuel to said second inlet port and, via said annular gap, to said chamber; and (d) third means adapted to operate in synchronism with the rotation of the engine crankshaft for periodically initiating needle valve movement from said closed position to said opened position in which said orifice is unblocked and a combination of coal-water mixture and pilot fuel can discharge from said chamber through said orifice into the associated cylinder for a predetermined interval;

(e) the average pressure in said chamber during each interval that said needle valve is closed being lower than the average pressure at which said pilot fuel is supplied to said second inlet port, whereby there is a net flow of pilot fuel through said annular gap and into said chamber;

(f) said annular gap being sufficiently constricted to limit the amount of pilot fuel delivered to said chamber during each valve-closed interval to a relatively small fraction of the amount of each discharge of coal-water mixture and pilot fuel when the engine is running at full load.

25. The integrated pilot fuel system of claim 24 wherein said first means includes a source of pressurized coal-water mixture, a check valve at the outlet of said source, and a fuel supply line connected from said check valve to said first inlet port, wherein the effective volume of said supply line and of said fluid passage means is substantially larger than the volume of said chamber, and wherein the part of said fluid passage means in communication with said chamber has a cross-sectional area selected to ensure that the pilot fuel delivered to said chamber tends to be concentrated adjacent to said orifice so that it will be discharged in advance of said coal-water mixture upon closed-to-opened movement of said needle valve when the engine is running at full speed.

26. The system of claim 25 wherein said small fraction is in a range of approximately three percent to approximately five percent (by heating value).

27. The integrated pilot fuel system of claim 24 wherein said injector assembly includes a pressure vessel, wherein said fluid passage means includes a relatively large accumulator chamber inside said vessel, wherein periodically operative pumping means is provided for causing said first means to deliver discrete, pressurized charges of coal-water mixture into said accumulator chamber while said needle valve is closed, and wherein said needle valve holding means comprises an auxiliary system in which a pressurized hydraulic medium applies a relatively high force to said needle valve in a direction holding it closed, said auxiliary system including control means responsive to the operation of said third means for relieving the hydraulic pressure and thereby permitting said needle valve to be rapidly moved from closed to opened positions by the fuel pressure in said nozzle chamber.

28. The system of claim 27 wherein said injector includes a fluid passage extending from said second inlet port to said auxiliary system, whereby said pilot fuel is said hydraulic medium.

29. The integrated pilot fuel system of claim 24 wherein said second means is so arranged as to supply pilot fuel to said second inlet port at a substantially constant high pressure of predetermined magnitude.

30. In an integrated pilot fuel system for periodically injecting, into a cylinder of a diesel engine having a crankshaft, a mixture of coal and water along with a pilot fuel that will aid ignition of the coal-water mixture:

(a) an injector comprising:
an assembly including a generally cylindrical, hollow nozzle portion adapted to project into a cylinder of the engine, an orifice in said nozzle portion, a chamber inside said nozzle portion adjacent to said orifice, first and second inlet ports, fluid passage means for connecting said first inlet port to said chamber, a cylindrical guide portion defining a concentric bore in the assembly, and second fluid passage means for connecting said second inlet port to a region of said chamber in relatively close proximity to said orifice;

a needle valve having a longitudinal section slidably disposed in the bore of the guide portion of said assembly for reciprocal movement between opened and closed positions, said needle valve also having means at one end thereof for blocking the discharge of fluid from said chamber through said orifice whenever said needle valve is in its closed position; and means for holding said needle valve in its closed position;

(b) first means connected to said first inlet port for supplying pressurized coal-water mixture to said chamber;

(c) second means effective while said needle valve is in its closed position for supplying pressurized pilot fuel to said second inlet port and, via said second fluid passage means, to said chamber; and (d) third means adapted to operate in synchronism with the rotation of the engine crankshaft for periodically initiating needle valve movement from said closed position to said opened position in which said orifice is unblocked and a combination of coal-water mixture and pilot fuel can discharge from said chamber through said orifice into the associated cylinder for a predetermined interval;

(e) said second fluid passage means being sufficiently constricted to limit the amount of pilot fuel delivered to said chamber during each interval that said needle valve is closed to a relatively small fraction of the amount of each discharge of coal-water mixture and pilot fuel when the engine is running at full load;

(f) the part of said first fluid passage means in communication with said chamber being dimensioned to ensure that a high concentration of pilot fuel will tend to accumulate in said chamber adjacent to said orifice during each valve-closed interval when the engine is running at full speed.

* * * * *